United States Patent Office 3,682,891
Patented Aug. 8, 1972

3,682,891
METHOD OF MAKING CARDENOLIDE-3-OXY-ESTERS OF AN HYDROXY ACID
Kurt Radscheit, Kelkheim, Taunus, Werner Fritsch, Neuenhain, Taunus, Werner Haede and Ulrich Stache, Hofheim, Taunus, and Ernst Lindner, Frankfurt am Main, Germany, assignors to Farbwerke Hoechst Aktiengesellschaft vormals Meister Lucius & Brüning, Frankfurt am Main, Germany
No Drawing. Filed Jan. 9, 1970, Ser. No. 1,883
Claims priority, application Germany, Jan. 14, 1969,
P 19 01 484.7
Int. Cl. C07c *173/00*
U.S. Cl. 260—239.57                    1 Claim

ABSTRACT OF THE DISCLOSURE

A method for synthesizing esters in which the acid moiety is that of a hydroxy acid and the alcohol moiety is a 3-hydroxy-cardenolide or 3-hydroxy-bufadienolide, by esterifying the sterol with an acid anhydride or an acid chloride of the hydroxy acid, the hydroxy groups of which have been acetalized or ketalized, and then selectively removing said acetal or ketal groups by acid hydrolysis.

Cardi-active oxy-esters produced by this method.

---

The present invention provides compounds of the General Formula I $$\text{St}-\text{O}-\underset{\underset{\text{O}}{\|}}{\text{C}}-\text{R}$$

in which St represents a steroid molecule of the 3-hydroxy-cardenolide or 3-hydroxy-bufadienolide series and R represents a straight chain, saturated alkyl group having 1–6 carbon atoms, at least one of these carbon atoms carrying a hydroxyl group which may be esterified or etherified.

As steroid alcohols, there may be used, for example, the following natural or synthetic cardenolides and bufadienolides: digitoxigenin, gitoxigenin, digoxigenin, periplogenin, 19-carbomethoxymethylene-periglogenin and other periplogenins which are substituted in the 19-position, uzarigenin, strophanthidin, strophanthidol, canarigenin, 4.5β-oxido-canarigenin, scillarenin, bufalin, hellebrigenin, The group

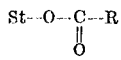

stands for an acyl group of a hydroxy-carboxylic acid, for example that of glycolic acid, lactic acid, hydracrylic acid, hydroxypropionic acids; that of aldonic acids, preferably of glyceric acid, xylonic acid, erythronic acid, threonic acid, gluconic acid, mannonic acid and galactonic acid.

The free hydroxyl groups of the hydroxy-carboxylic acid radicals may be esterified and may be present, for example in the form of formates, acetates, trifluoroacetates, p-toluene-sulfonates, methyl-sulfonates, carbonates, or, if the radicals contain several hydroxyl groups, they may also be present in the form of cyclic carbonates or cyclic sulfites.

The hydroxyl groups of the hydroxy-carboxylic acid radicals may also be present in the form of cyclic acetals or ketals, in which case the OH-group is bound in ether-like form. O-methylene, O-ethylidene, O-isopropylidene and O-benzylidene derivatives are preferably used.

The present invention furthermore provides a process for the manufacture of the above-specified compounds of the general Formula I, wherein (a) A steroid alcohol of the formula St—OH is esterified with an acid chloride of the corresponding hydroxy-acid whose hydroxyl groups are modified by acetal- or ketal-formation, and, if desired, the acetal or ketal groups are subsequently subjected to acid hydrolysis and, if desired, the free hydroxyl groups of the hydroxy-acid radical are esterified or etherified, or (b) A corresponding steroid alcohol is reacted with an acid chloride of the corresponding hydroxy-acid which is esterified at the hydroxyl groups.

The esterification of the steroid alcohol with the hydroxy-acid is carried out according to known methods. The process is effected in the presence of an organic base, preferably pyridine, in an inert solvent, preferably benzene, tetrahydrofurane or dioxane. It is also possible to use pyridine alone as the solvent. The reaction can be carried out within a wide temperature range; it is preferred to operate at temperatures between 0° C. and room temperature. The reaction time may be varied within wide limits; preferably, it is 1–2 hours. The acid chloride is used in an equimolar amount or in an excess amount, preferably about 1.2 molar equivalents of the acid chloride are used. Working up is effected according to the usual methods.

The crude esters are purified either by chromatography or by trituration with solvents, for example petroleum ether and ether.

If desired, the purified products or also the crude esters, in case the hydroxyl groups of the hydroxy-acid radical are bound by acetals or ketals, may be freed from the acetal or ketal groups by partial acid hydrolysis by means of dilute or weak acids. This hydrolysis may be effected, for example with the systems dilute $H_2SO_4$/aqueous acetone or dioxane/oxalic acid, glacial acetic acid/water, boric acid/ethyl borate, and boric acid/2-methoxy-ethanol. The operation is effected at temperatures in the range of from $-10°$ C. to the boiling point of the solvent. Depending on the system used, the hydrolysis is complete after one minute to 24 hours. For example, for the hydrolysis in the system glacial acetic acid/water a temperature of 100° C. and a reaction time of 1 hour is necessary.

The free OH-groups thus obtained may subsequently be etherified according to the methods usual in carbohydrate chemistry; it is preferred to prepare ethers of lower aliphatic alcohols or of benzyl-alcohol.

Depending on the acid chloride used, the esters of the general Formula I consist of one pair of diastereomers or of one of the diastereomers.

If the steroid alcohol used contains further primary or secondary hydroxyl groups, these are likewise esterified in general under the indicated reaction conditions, especially when corresponding or excess amounts of the acid chloride are used.

The process of the present invention is surprising, because it was not to be expected that it would be possible to eliminate the acetal or ketal groups selectively by an acid treatment, since it is known that the very acid-sensitive OH-group in the 14β-position of the steroid-cardenolides and steroid-bufadienolides used is easily split off in an acid medium under formation of a double bond.

The products of the invention have valuable pharmacological properties. They are distinguished, for example by inotropic, cardiovascular, diuretic and anti-diarrheal action. Those compounds which contain free hydroxyl groups are superior over the steroid alcohols used in that they are better soluble in water. With regard to their inotropic action, the products of the invention are excellently suitable for replacing the corresponding, naturally occuring cardenolide- or bufadienolide-glycosides, the cardio-activity of which is well known. This is very important, because it is known that the glycosidation of 3-hydroxy-cardenolides or 3-hydroxy-bufadienolides in most cases can be carried out with quite unsatisfactory results only (cf. Zorbach, "Advances in Carbohydrate Chemistry," vol. 21 (1966), pp. 311 et seq.). In contradistinction thereto, the products of the invention are well accessible.

The following examples illustrate the invention:

EXAMPLE 1

Strophanthidin-3β-(1,2-O-isopropylidene)-d,l-glycerinate 2 g. of acetone-d,l-glyceric acid chloride were added, while cooling with ice, to a solution of 0.5 g. of strophanthidin in 15 ml. of pyridine. The solution was stirred for 16 hours at room temperature, then poured into an ice-cold aqueous solution of sodium bicarbonate and extracted with chloroform. The extracts were washed with a saturated solution of sodium chloride, dried over sodium sulfate and evaporated under reduced pressure. If necessary, the residue was chromatographed on neutral aluminium oxide. The fractions obtained using methylene chloride as eluent were united and brought to crystallize by trituration with a small amount of methanol. 300 mg. of product were obtained. Melting point: 200–207° C. Infrared spectrum: 3540 cm.$^{-1}$, 2740 cm.$^{-1}$, 1775 cm.$^{-1}$, 1750–1705 cm.$^{-1}$, 1615 cm.$^{-1}$, 1195 cm.$^{-1}$, 1090 cm.$^{-1}$, 1040 cm.$^{-1}$, 1020 cm.$^{-1}$.

EXAMPLE 2

Strophanthidin-3β-d,l-glycerinate

A solution of 290 mg. of strophanthidin-3β-(1,2-O-isopropylidene)-d,l-glycerinate (Example 1) in 8 ml. of a mixture of glacial acetic acid and water (5:2) was heated for 1 hour to 100° C. under an atmosphere of nitrogen, poured into an ice-cold aqueous solution of sodium bicarbonate and extracted several times with methylene chloride. The extracts were washed with a saturated solution of sodium chloride until neutrality, dried over sodium sulfate and evaporated under reduced pressure. The residue was brought to crystallization by trituration with a small amount of ethyl acetate and diethyl ether. 150 mg. of product melting at 134° C. (with decomposition) were obtained.

Infrared spectrum: 3420–3480 cm.$^{-1}$, 2740 cm.$^{-1}$, 1775 cm.$^{-1}$, 1750–1705 cm.$^{-1}$, 1615 cm.$^{-1}$.

Ultraviolet spectrum: $\lambda_{max}$=215 m$\mu$ (18,300).

EXAMPLE 3

Digitoxigenin-3β-(1,2-O-isopropylidene)-d,l-glycerinate 0.264 g. of acetone-d,l-glyceric acid chloride was added, while cooling with ice, to a solution of 0.5 g. of digitoxigenin in 6 ml. of anhydrous pyridine, stirred for 1 hour at room temperature and poured into an ice-cold aqueous solution of sodium bicarbonate. The precipitate was separated by filtration, washed with water until neutrality and dried over P$_2$O$_5$. 500 mg. of product melting at 196–203° C. were obtained.

Infrared spectrum: 3540 cm.$^{-1}$, 1775 cm.$^{-1}$, 1725–1750 cm.$^{-1}$, 1615 cm.$^{-1}$, 1190–1210 cm.$^{-1}$, 1095 cm.$^{-1}$, 1060 cm.$^{-1}$, 1015 cm.$^{-1}$.

EXAMPLE 4

Digitoxigenin-3β-d,l-glycerinate

In a manner analogous to that described in Example 2, there were obtained from 380 mg. of digitoxigenin-3β-(1,2-O-isopropylidene)-d,l-glycerinate 280 mg. of digitoxigenin-3β-d,l-glycerinate. Melting point: from 202° C. onwards (unsharp).

Infrared spectrum: 3400–3460 cm.$^{-1}$, 1775 cm.$^{-1}$, 1720–1735 cm.$^{-1}$, 1615 cm.$^{-1}$.

Ultraviolet spectrum: $\lambda_{max}$=215 m$\mu$ (17,701).

EXAMPLE 5

Strophanthidol-3,19-bis[(1,2-O-isopropylidene)-d,l-glycerinate]

2.05 g. of acetone-d,l-glyceric acid chloride were added, while cooling with ice, to a solution of 2.1 g. of strophanthidol in 15 ml. of anhydrous pyridine and the whole was stirred for 1½ hours at room temperature. The reaction mixture was worked up as described in Example 1, adsorbed on neutral aluminum oxide and eluted with methylene chloride/methanol. After evaporation of the eluate and trituration of the residue with a mixture of acetone and petroleum ether, there were obtained 1.4 g. of crystallized strophanthidol-3,19-bis-[(1,2-O - isopropylidene)-d,l-glycerinate] in form of a mixture of the diastereomers.

Infrared spectrum: 3540 cm.$^{-1}$, 1765 cm.$^{-1}$, 1725–1750 cm.$^{-1}$, 1615 cm.$^{-1}$, 1190–1200 cm.$^{-1}$, 1090 cm.$^{-1}$, 1060 cm.$^{-1}$, 1025 cm.$^{-1}$.

Ultraviolet spectrum: $\lambda_{max}$=215 m$\mu$ (17,700).

EXAMPLE 6

Strophanthidol-3,19-bis-[d,l-glycerinate]

In a manner analogous to that described in Example 2, there were obtained from 1.4 g. of strophanthidol-3,19-bis-[(1,2-O-isopropylidene)-d,l-glycerinate] 800 mg. of amorphous strophanthidol - 3,19 - bis-[d,l-glycerinate] in form of a mixture of the diastereomers.

EXAMPLE 7

19-carbomethoxymethylene-periplogenin-3β-](1,2-O-isopropylidene)-d,l-glycerinate]

0.44 g. of acetone-d,l-glyceric acid chloride was added, while cooling with ice, to a solution of 490 mg. of 19-carbomethoxymethylene-periplogenin (obtained by the reaction of k-strophantidin with carbomethoxymethyl-diethyl phosphonate in the presence of sodium hydride in tetrahydrofurane) in 5 ml. of anhydrous pyridine and the whole was stirred for 1 hour at room temperature. After working up according to Example 1 and trituration of the crude product with petroleum ether, there were obtained 562 mg. of product. Melting point 211–220° C.

Ultraviolet spectrum: $\lambda_{max}$=215 m$\mu$ (20,800).

Infrared spectrum: 3460–3500 cm.$^{-1}$, 1775 cm.$^{-1}$, 1710–1750 cm.$^{-1}$, 1615–1620 cm.$^{-1}$, 1190–1200 cm.$^{-1}$, 1095 cm.$^{-1}$, 1065 cm.$^{-1}$, 1020 cm.$^{-1}$.

EXAMPLE 8

19-carbomethoxymethylene-periplogenin-3β-[d,l-glycerinate]

In a manner analogous to that described in Example 2, there were obtained from 500 mg. of 19-carbomethoxymethylene-periplogenin - 3β-[(1,2-O-isopropylidene)-d,l-glycerinate] 380 mg. of 19 - carbomethoxymethylene-periplogenin - 3β - (d,l-glycerinate] (as a mixture of the isomers); melting point: 296–298° C. (recrystallized from a mixture of ether and petroleum ether).

Infrared spectrum: 3440–3480 cm.$^{-1}$, 1775 cm.$^{-1}$, 1695–1750 cm.$^{-1}$, 1615 cm.$^{-1}$.

EXAMPLE 9

Canarigenin-3β-[(1,2-O-isopropylidene)-d,l-glycerinate]

540 mg. of acetone-d,l-glyceric acid chloride were added, at 0° C., to a solution of 490 mg. of canarigenin in 5 ml. of anhydrous pyridine, the whole was stirred for 3 hours at room temperature and worked up as described in Example 1. After trituration of the crude product with a mixture of ether and petroleum ether, there were obtained 480 mg. of product which had a melting point of 153–157° C.

Infrared spectrum: 3490–3560 cm.$^{-1}$, 1775 cm.$^{-1}$, 1725–1750 cm.$^{-1}$, 1620 cm.$^{-1}$, 1195–1210 cm.$^{-1}$, 1095 cm.$^{-1}$, 1065 cm.$^{-1}$, 1020 cm.$^{-1}$.

EXAMPLE 10

Canarigenin-3β-(pentaacetyl-D-gluconate)

A solution of 1.14 g. of pentaacetyl-gluconic acid chloride in 30 ml. of absolute tetrahydrofurane and 12 ml. of anhydrous pyridine was added, while cooling with ice, to a solution of 200 mg. of canarigenin in 30 ml. of absolute tetrahydrofurane. After a reaction time of 18 hours at room temperature, the reaction mixture was poured into ice-water and extracted with chloroform. The extracts were washed successively with binormal HCl, water, a solution of sodium bicarbonate and again with water, dried over sodium sulfate and evaporated to dryness under reduced pressure. The residue was recrystallized from hot water. 400 mg. of canarigenin-3β-(petaacetyl-D-gluconate) melting at 75–78° C. were obtained.

Infrared spectrum: 3410–3510 cm.$^{-1}$, 1740–1760 cm.$^{-1}$, 1615–1620 cm.$^{-1}$, 1200–1225 cm.$^{-1}$.

We claim:

1. A method for making a cardenolide 3-oxy-ester of a hydroxy acid which comprises esterifying a 3-hydroxy-cardenolide with the acid chloride of the formula

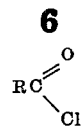

wherein R is saturated straight-chain alkyl having 1–6 carbon atoms having one or more acetalized or ketalized hydroxy groups thereon, and then removing the ketal or acetal groups by acid hydrolysis to form said hydroxy acid 3-oxy-ester.

References Cited

UNITED STATES PATENTS

| | | | |
|---|---|---|---|
| 1,825,812 | 10/1931 | Neumann | 260—239.57 |
| 2,305,570 | 12/1942 | Dorn | 260—239.57 |
| 2,429,171 | 10/1947 | Ruzicka et al. | 260—239.57 |
| 2,752,372 | 6/1956 | Reichstein | 260—397.45 |
| 2,885,413 | 5/1959 | Hogg et al. | 260—397.45 |

HENRY A. FRENCH, Primary Examiner

U.S. Cl. X.R.

260—999